UNITED STATES PATENT OFFICE.

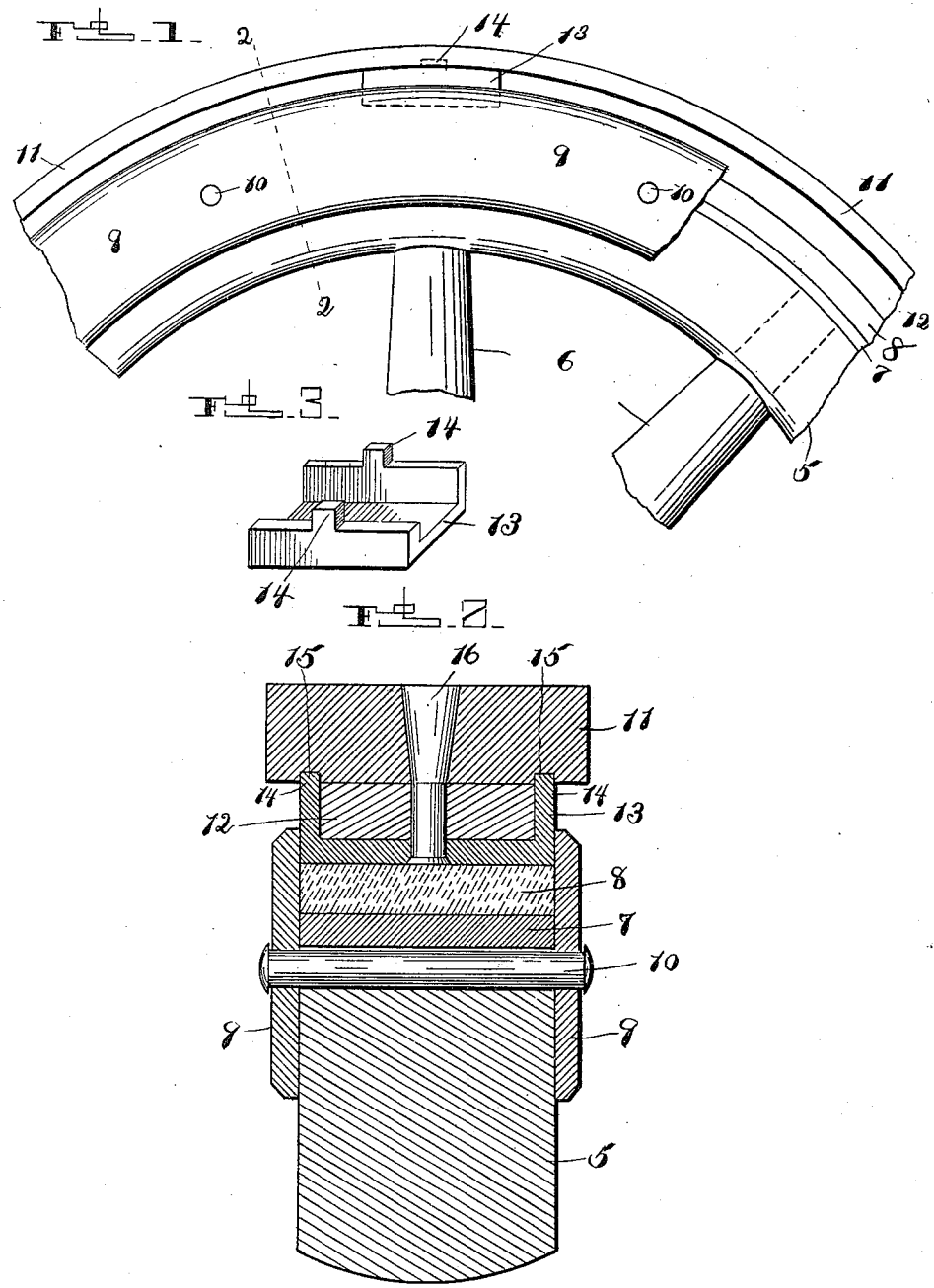

WILLIAM F. MASTERS, OF NEW YORK, N. Y.

TIRE FOR VEHICLES.

SPECIFICATION forming part of Letters Patent No. 662,008, dated November 20, 1900.

Application filed August 1, 1900. Serial No. 25,494. (No model.)

*To all whom it may concern:*

Be it known that I, WILLIAM F. MASTERS, a citizen of the United States, residing at New York, (Brooklyn,) in the county of Kings and State of New York, have invented certain new and useful Improvements in Tires for Vehicles, of which the following is a full and complete specification, such as will enable those skilled in the art to which it appertains to make and use the same.

This invention relates to tires for vehicles; and the object thereof is to provide an improved tire which is particularly adapted for use in connection with heavy vehicles, such as express-wagons and other vehicles designed for heavy loads, but which may also be used in connection with lighter vehicles whenever desired.

The invention is fully disclosed in the following specification, of which the accompanying drawings form a part, in which the separate parts of my improvement are designated by the same reference characters in each of the views, and in which—

Figure 1 is a side view of a part of the tire of a wheel made according to my invention; Fig. 2, a cross section thereof on the line 2 2, and Fig. 3 a perspective view of a detail of the construction.

In the drawings forming part of this specification I have shown at 5 a part of the rim of a wheel with which in practice the spokes 6 are connected, and in the practice of my invention I place on the rim 5 a heavy steel band 7, around which is placed a ring or band 8, of rubber, which is much thicker than the steel band 7. The rings or bands 7 and 8 are held in place by side plates 9, which extend entirely around the rim of the wheel and which are secured thereto by bolts 10, and I also provide a heavy outer steel band or ring 11, which constitutes the tire proper and on the inner side of which is placed a ring or band 12 of wood. The ring or band 11, of steel, and the ring or band 12, of wood, are connected by clips 13, which are countersunk in the ring or band 12 and any desired number of which may be employed, and said clips are of the form shown in Fig. 3 and are countersunk in the inner side of the ring or band 12 and in the opposite sides thereof, and the opposite sides of the clip are provided centrally with lugs or projections 14, which enter corresponding notches or recesses 15 in the inner side of the outer ring or band, as is clearly shown in Fig. 2.

The outer ring or band 11, of steel, which constitutes the tire proper, and the ring or band 12, of wood, which is secured therein, are connected by rivets 16, as clearly shown in Fig. 2, and which passes therethrough, the outer end of said rivets being beveled from the inner side of the ring or band 11 outwardly, and the inner end of said rivets being beveled and countersunk in the body of the clip 13.

In practice the rings or bands 11 and 12 are connected, as shown in Fig. 2, and are then placed around the rubber ring or band 8, and all the parts of the tire are held together by the side plates 9, which are then bolted to the rim 5.

It will be observed that the outer edges of the plates 9 project about half-way over the outer ring or band 12, of wood, the object of this construction being to give full play to the rubber ring or band 8 and to admit of the compression thereof, and the object in making the outer ring or band 11, which is composed of steel, wider than the other rings or bands and wider than the rim 5 is to protect the side plates 9 and give a broad tread to the wheel. This last construction, however, is not absolutely necessary and the plates 9 may be countersunk in the rim 5, if desired, in which event the various elements of the tire, with the extensions of the outer ring or band 11, must be made narrower, and said ring or band 11 may also be made narrower, if desired. By means of this construction I provide a tire which possesses great elasticity and at the same time great durability, and by means of the elastic feature of the tire the vehicle is prevented from jolting and jarring, which is always an injury thereto, and the wheels themselves are made more durable, as are also the separate parts of the vehicle.

It will be understood that the rim of the wheel or wheels is made of wood and consists in the usual way of separate fellies. The inner steel ring or band serves for the purpose of binding the wheel together and securing the rim to the spokes thereof, and in this respect it serves the purpose of an ordinary tire.

The thickness of the separate elements of my improved tire may be varied as desired; but I prefer to regulate or proportion the same when used in connection with heavy vehicles about as shown in Fig. 2 of the drawings; but various changes in and modifications of the construction herein shown and described may be made without departing from the spirit of my invention or sacrificing its advantages.

Having fully described my invention, I claim as new and desire to secure by Letters Patent—

1. A tire for vehicle-wheels, comprising a steel band which incloses the rim of the wheel, a rubber band placed around said steel band, a band of wood placed around the rubber band, and an outer band of steel placed around the band of wood, the outer bands of rubber and steel being connected by rivets passed therethrough, and the band of wood being provided with clips which inclose the same and are countersunk therein and through which said rivets also pass, and the rim of the wheel being provided with side plates bolted thereto which inclose the inner band of steel, the rubber band, and partially inclose the band of wood, substantially as shown and described.

2. A tire for vehicle-wheels having a rim composed of fellies of wood, comprising rings or bands of metal, rubber, wood and metal secured to the rim of the wheel in the order named, the inner band of metal being secured to the rim of the wheel in the manner of an ordinary tire, and serving to hold the fellies and spokes of the wheel in place, and the outer rings or bands of wood and metal being connected, and the rim of the wheel being also provided with annular side plates bolted thereto, and which inclose the inner rings or bands of steel and rubber and partially inclose the ring or band of wood, substantially as shown and described.

In testimony that I claim the foregoing as my invention I have signed my name, in presence of the subscribing witnesses, this 23d day of July, 1900.

WILLIAM F. MASTERS.

Witnesses:
F. A. STEWART,
M. K. LOWERRE.